US008577843B1

(12) United States Patent
Lasensky et al.

(10) Patent No.: US 8,577,843 B1
(45) Date of Patent: Nov. 5, 2013

(54) SYSTEM AND METHODS FOR USING A PLURALITY OF RECEIVER IDENTIFICATIONS TO CREATE AND RETRIEVE A DIGITAL PROJECT LOG

(75) Inventors: Peter Joel Lasensky, San Diego, CA (US); Mark Everett Fehrenbach, San Diego, CA (US); Richard Edward Rohmann, San Diego, CA (US)

(73) Assignee: Pacific Datavision, Inc., San Diego, CA (US)

( * ) Notice: Subject to any disclaimer, the term of this patent is extended or adjusted under 35 U.S.C. 154(b) by 3117 days.

(21) Appl. No.: 11/016,606

(22) Filed: Dec. 16, 2004

Related U.S. Application Data

(63) Continuation-in-part of application No. 10/384,408, filed on Mar. 6, 2003, now abandoned, which is a continuation of application No. 09/713,487, filed on Nov. 15, 2000, now abandoned.

(51) Int. Cl.
*G06F 7/00* (2006.01)

(52) U.S. Cl.
USPC .......................................................... 707/648

(58) Field of Classification Search
USPC .............................. 707/648, 999.101, 999.102
See application file for complete search history.

(56) References Cited

U.S. PATENT DOCUMENTS

| | | | |
|---|---|---|---|
| 5,003,576 A | 3/1991 | Helferich | |
| 5,105,197 A | 4/1992 | Clagett | |
| 5,179,627 A | 1/1993 | Sweet et al. | |
| 5,535,322 A | 7/1996 | Hecht | |
| 5,553,279 A * | 9/1996 | Goldring | 707/615 |
| 5,613,113 A * | 3/1997 | Goldring | 1/1 |
| 5,630,205 A | 5/1997 | Ekelund | |
| 5,646,839 A | 7/1997 | Katz | |
| 5,659,742 A * | 8/1997 | Beattie et al. | 1/1 |
| 5,675,507 A | 10/1997 | Bobo | |
| 5,737,532 A | 4/1998 | DeLair et al. | |
| 5,745,551 A | 4/1998 | Strauch et al. | |
| 5,796,727 A | 8/1998 | Harrison et al. | |
| 5,825,854 A | 10/1998 | Larson et al. | |
| 5,835,575 A | 11/1998 | Stoller et al. | |

(Continued)

FOREIGN PATENT DOCUMENTS

| | | |
|---|---|---|
| JP | 08172808 | 12/1997 |
| WO | 0148986 A1 | 7/2001 |

(Continued)

OTHER PUBLICATIONS

International Search Report for PCT/US04/29493 dated Sep. 29, 2005.

(Continued)

*Primary Examiner* — Hosain Alam
*Assistant Examiner* — Eliyah S Harper
(74) *Attorney, Agent, or Firm* — Procopio, Cory, Hargreaves & Savitch LLP; Noel C. Gillespie

(57) ABSTRACT

A method for updating a digital project log comprises receiving via one of the plurality of receivers an observation, the observation comprising one of a plurality of observer identifiers, selecting a project log based on the combination of the observer identifier included with the observation and the receiver identifier associated with the receiver used to receive the observation, and storing information included in the observation in the selected project log.

18 Claims, 6 Drawing Sheets

(56) References Cited

U.S. PATENT DOCUMENTS

| | | | |
|---|---|---|---|
| 5,848,426 A * | 12/1998 | Wang et al. | 715/210 |
| 5,867,821 A | 2/1999 | Ballantyne et al. | |
| 5,963,912 A | 10/1999 | Katz | |
| 6,009,398 A | 12/1999 | Mueller et al. | |
| 6,021,410 A | 2/2000 | Choy | |
| 6,144,942 A | 11/2000 | Ruckdashel | |
| 6,175,822 B1 | 1/2001 | Jones | |
| 6,292,783 B1 | 9/2001 | Rohler et al. | |
| 6,298,326 B1 | 10/2001 | Feller | |
| 6,321,078 B1 | 11/2001 | Menelli et al. | |
| 6,405,215 B1 * | 6/2002 | Yaung | 1/1 |
| 6,421,009 B2 | 7/2002 | Suprunov | |
| 6,433,732 B1 | 8/2002 | Dutta et al. | |
| 6,442,250 B1 | 8/2002 | Troen-Krasnow et al. | |
| 6,442,604 B2 | 8/2002 | Romine | |
| 6,456,852 B2 | 9/2002 | Bar et al. | |
| 6,564,071 B1 | 5/2003 | Bergins et al. | |
| 6,591,242 B1 | 7/2003 | Karp et al. | |
| 6,745,229 B1 * | 6/2004 | Gobin et al. | 709/206 |
| 7,213,030 B1 * | 5/2007 | Jenkins | 1/1 |
| 7,308,484 B1 * | 12/2007 | Dodrill et al. | 709/218 |
| 2001/0051990 A1 | 12/2001 | Shirakawa | |
| 2002/0057203 A1 | 5/2002 | Borders et al. | |
| 2002/0161801 A1 | 10/2002 | Hind et al. | |
| 2002/0194281 A1 | 12/2002 | McConnell et al. | |
| 2003/0204568 A1 | 10/2003 | Bhargava et al. | |
| 2004/0047303 A1 | 3/2004 | Fernandez et al. | |
| 2005/0176451 A1 | 8/2005 | Helferich | |
| 2005/0186945 A1 | 8/2005 | Manzor | |

FOREIGN PATENT DOCUMENTS

| | | | |
|---|---|---|---|
| WO | 0172018 A2 | 9/2001 | |
| WO | 0184815 A1 | 11/2001 | |
| WO | 0241222 A1 | 5/2002 | |
| WO | 03096212 A | 11/2003 | |

OTHER PUBLICATIONS

Database WPI Section EI, "Medical image database management system used in hospital-controls additional connection of diagnostic image database to network during generation of diagnostic report file by scanning medical image displayed in medical image work station", Derwent Publications Ltd., London, GB, Class S05, AN1998-106801, XP002192976 & JP09330374A.

Sawhney and Schmandt, "Nomadic Radio: Speech and Audio Interaction for Contextual Messaging in Nomadic Environments" Speech Interface Group, MIT Media Laboratory, ACM Transactions on Computer-Human Interaction, vol. 7, No. 3, Sep. 2000, pp. 353-383.

Supplementary European Search Report for related EP Application No. 05800098.5 dated Nov. 4, 2010 (7 pages).

European Search Report issued in corresponding EP Patent Application No. 10191464.6 on Jan. 4, 2012, 7 pages.

\* cited by examiner

SYSTEM AND METHODS FOR USING A PLURALITY OF RECEIVER IDENTIFICATIONS TO CREATE AND RETRIEVE A DIGITAL PROJECT LOG

REFERENCE TO RELATED APPLICATIONS

This application is a continuation in part under 35 USC §119 of U.S. patent application Ser. No. 10/384,408, filed Mar. 6, 2003 now abandoned, entitled "Systems and Methods for Using a Plurality of Receiver Identifications to Create and Retrieve a Digital Project Log," which is in turn a continuation of U.S. patent application Ser. No. 09/713,487, filed Nov. 15, 2000 now abandoned, entitled "Communication System and Method for Forming a Project Log," both of which are incorporated herein in the entirety as if set forth in full.

BACKGROUND OF THE INVENTION

1. Field of the Invention

This invention relates broadly to the field of communications, and more particularly to a communication system and method for forming a project log.

2. Description of the Related Art

Many human endeavors can be "projectized," that is, reduced to a systematic plan or design and undertaken as such. One example of a project is related to the construction industry, where a thing being constructed is conceptualized and reduced to a series of construction steps. Another example of a project is related to any service industry. For example, in medical-care services, a patient is diagnosed and treated according to a series of predefined medical steps.

One valuable aspect of projects is their characteristic of being able to be monitored and measured against a plan or design. For example, construction projects may be regularly monitored for progress toward completion of one or more construction plans. In one specific example, a superintendent of a construction project might monitor a project on a daily basis, and make a written entry into a log of his or her findings. In another specific example, a patient that requires extended medical care is monitored frequently, and his or her progress is memorialized in a written log known as the patient's record.

Various tools exist for managing projects. One example of such a tool is a computer-based software product called Contractor's Command Post™. A valuable feature of the Contractor's Command Post' product is, in addition to tracking and managing project resources, its ability to compile a project log for a particular project. The project log is accessible for retrieving, analyzing, and adding observation information about a particular. project. The project log provides useful information for fully managing a project that is completed step-by-step.

There are many mechanisms for forming and maintaining a project log. The simplest, and most common, mechanism is a written log, where a person who monitors a project makes a text-based entry into the log. Such written logs may be formed with a computer, or by hand with a pen and paper. Problems with a written log include the fact that text-based entry is tedious, leading to omissions in whole or in part. Hand writing, or even typing, can sometimes be difficult to comprehend and understand, and it is difficult to consolidate text entries into a master log file because some entries are misplaced, lost, or sometimes never made.

Another mechanism is to use a recording device for creating a log. The recording device may be a tape recorder or a video recorder, where the recording preserves a monitoring person's observations on a recording medium. Problems with conventional recording mechanisms are that a recording medium, such as a cassette tape, microcassette, or video cassette, can be lost or otherwise inaccessible. If they are accessible, it is usually only accessible to only one user or otherwise limited to a small number of persons who maintain a copy. Further, copies are difficult to reproduce and distribute effectively. Finally, conventional recordings are difficult to compile in a way that the recording media can be arranged in some logical, easily retrievable order.

What is needed is a system and method of forming a project log that leverages technological resources in a unique way, for efficient and cost effective recordation of observations that are related to a project.

SUMMARY OF THE INVENTION

A digital project log system comprises a plurality of observers making observations associated with a plurality of project logs using observer devices. The observer devices are associated with an observer identifier and are used to transmit observations to a plurality of receivers, where each if the plurality of receivers is also associated with a unique receiver identifier.

In one aspect, the system can select the project log associated with a given observation based on the combination of the observer identifier associated with the observer device used to send the observation and the receiver identifier associated with the receiver used to receive the observation.

These and other features, aspects, and embodiments of the invention are described below in the section entitled "Detailed Description."

DETAILED DESCRIPTION OF THE PREFERRED EMBODIMENTS

Figure 1:
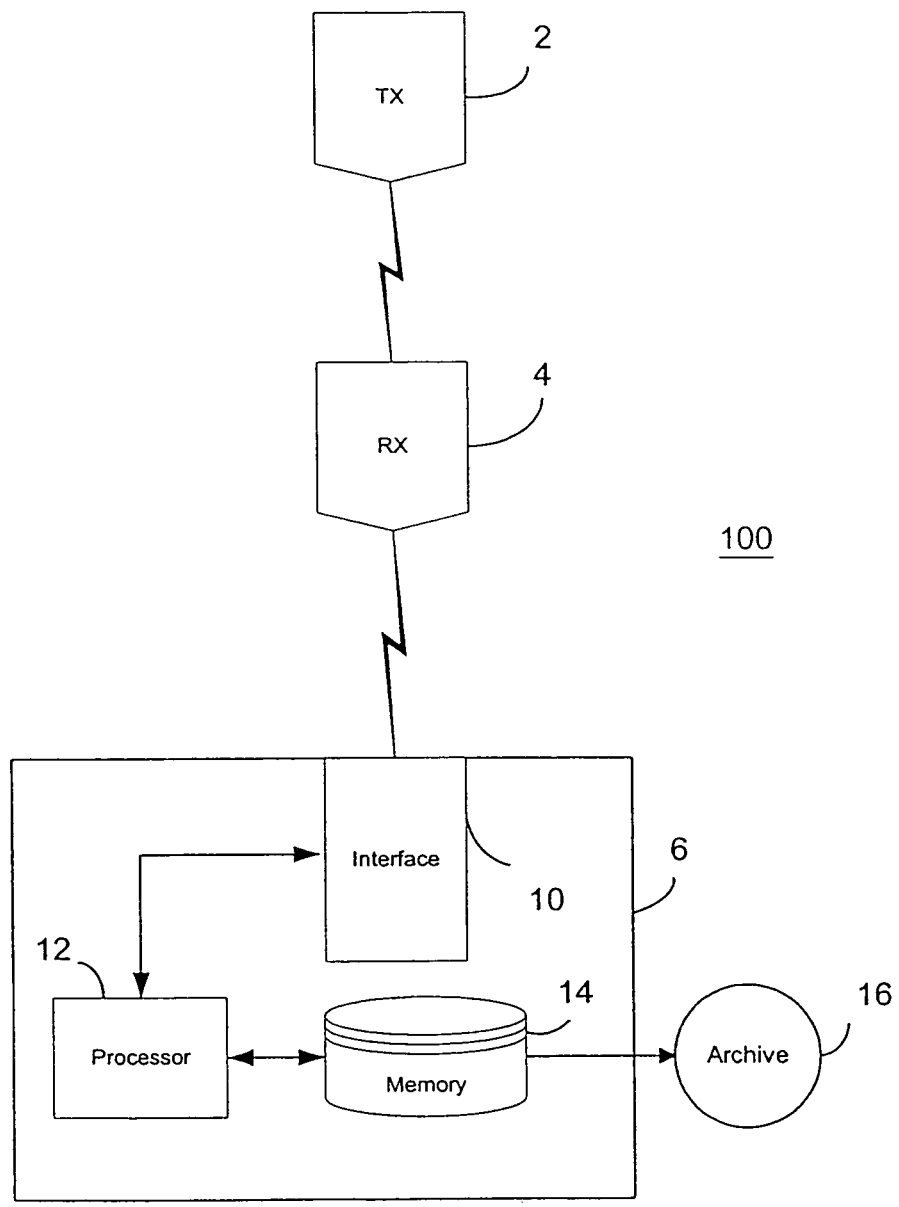
FIG. 1 is a simplified block diagram of a system that is suitable for an embodiment of the invention.

FIG. 1 shows a system 100 that is suitable for forming a project log according to the invention. The system 100 includes a transmission device 2 for transmitting data and a receiving device 4 for receiving the data. Those having skill in the relevant art would recognize that designations used herein for the transmission and receiving devices are relative, and as such are not meant to limit such devices to having one specific functionality. For example, the transmission device 2 may be a cellular phone having two-way radio functionality, in which the transmission device is also able to receive incoming transmissions. Likewise, the receiving device 4 may also be a two-way device having both receive and transmission capabilities. Other embodiments will illustrate various examples of the transmission and receive devices 102, 104.

Transmission device's 2 can be used by observers to make observations related to a particular project log and can thus be referred to alternatively as observer devices. As explained below in more detail, an observer identifier associated with each transmission device 2 can be used to select the correct project log associated with an observation transmitted using a given transmission device 2.

Thus, data being transmitted by a particular transmission device 2, in accordance with the invention, represents an observation associated with a specific project. An observation includes a single observation event, or a collection of observation events. The observation may also be represented in a digital or analog recording of an inspection of the project, for example. The observation may also be represented as an event in which a person speaks into a cellular phone, radio or other transmission device or video, tape recording, or video recording device, at the time of observing a project. In such cases, the data being transmitted represents a real time, or near-real time, observation by one or more persons, and the data may be formed and transmitted in as close a time to the observation as desirable.

The system 100 further includes a computer 6. In accordance with the invention, the computer 6 includes a data communication interface 10 for communication with the receiving device 4 to receive data transmitted by the transmitting device 2. The computer 6 also includes a processor 12 configured to convert the received data into a digital file format, generate one or more reference indicia associated with the data, and append the reference indicia to the digital file.

The digital file format can be a WAV file if the data is audio or voice data, or another digital format depending on the format and type of data being transmitted. The digital file may ultimately be stored as a compressed digital file, such as an MPEG-1, audio layer-3 (MP3) file used for compressing sound sequences to roughly one-twelfth the original size of the file. Other compression techniques for other types of data may suitably be used. The reference indicia includes time, date, or duration of the monitoring event, time, date, or duration of the digital representation of the monitoring event or the recording thereof. The reference indicia could also include a job identification, such as job number, type, or other information relating to a job, such as name, code- or pseudo-name.

The computer 6 further includes a memory 14 connected to the processor 12, for storing the digital file. The memory includes a database, such as a relational or object-oriented database, e.g., a project log database, for referencing the digital file that is stored in another portion of the memory 14. The memory 14 is represented in FIG. 1 as a single block, however, it may also be implemented as a distributed or parallel memory subsystem. Further, the memory 14 may be external to the computer 6 and connected to the processor via a network connection, for example. An archive 16 is connected to the memory 14 and provides for long-term storage and access of a collection of digital files. The digital files may be transferred directly from the memory 14 or indirectly via temporary storage mechanism.

Figure 2:
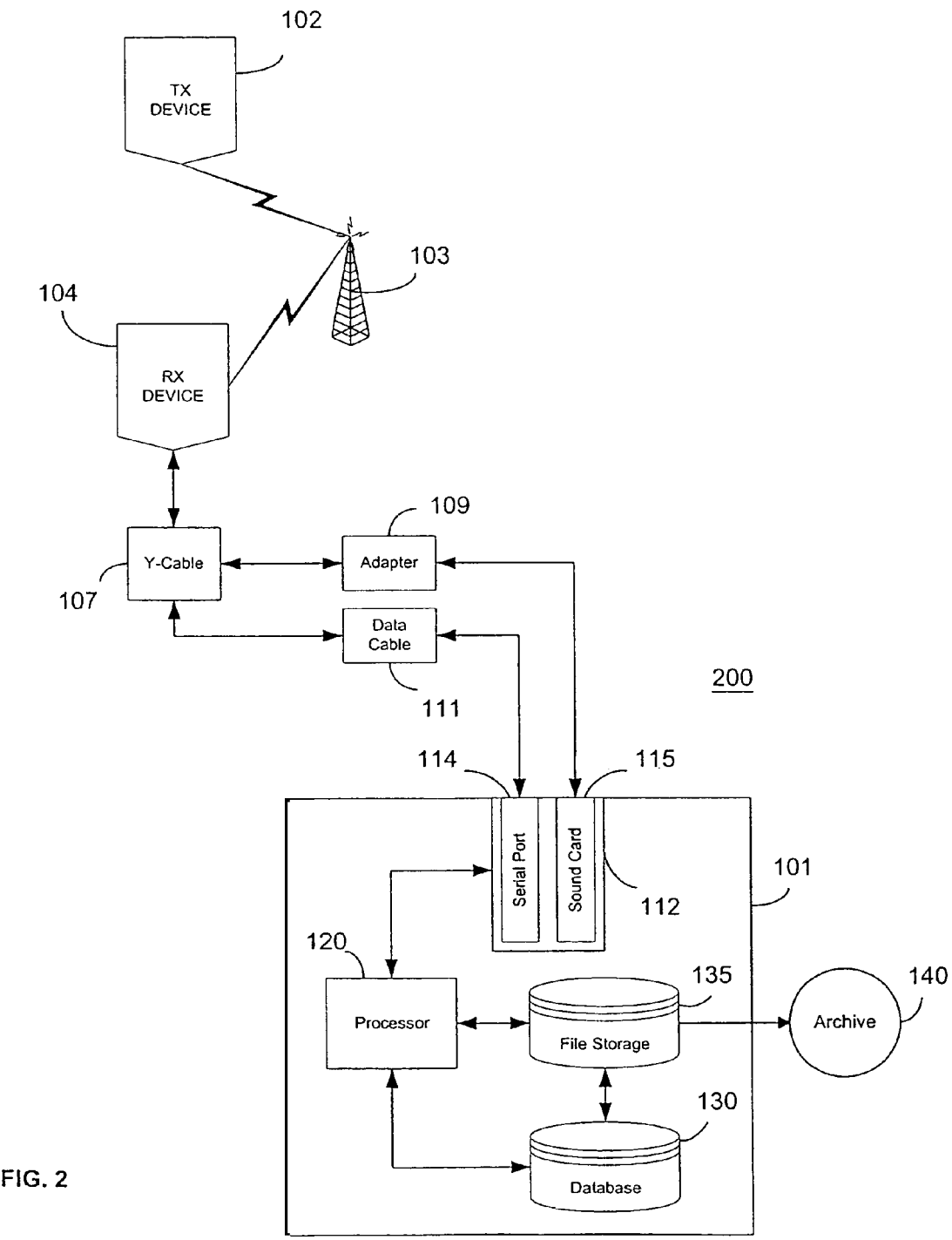
FIG. 2 shows one embodiment of a system for forming a project log, according to the invention.

FIG. 2 shows a specific embodiment of a system 200 according to the invention. In the specific embodiment, a transmission device 102 and a receive device 104 are wireless devices communicating to each other via a wireless network 103. In an exemplary embodiment, the transmission device 102 is a two-way cellular radio. One type of two-way cellular radios is known as a Direct Connect' radio sold by Nextel Inc., and provided as a function on a Nextel cellular phone. Another type of two-way radio is the IDEN™ phone, sold by Motorola Inc. Broadly, such devices can be referred to as push-to-talk devices. More conventional two-way cellular radios, i.e., cellular telephones, can also be used. In the specific embodiment, the transmission device 102 uses the radio frequency spectrum to establish a direct radio link to the receiving device 104, which can also be a two-way cellular radio. The link from transmission device 102 to receiving device 104 may be formed via a cellular network 103.

In the exemplary embodiment shown in FIG. 2, a data communication interface 112 includes a serial port 114 and a sound card 115. The serial port 114 is connected to a data cable 111 to form a control channel, for transmitting control data and instructions between the receiving device 104 and the computer 101. The sound card 115 is connected to an adapter 109 to form a data channel, and is configured to receive audio data from the receiving device 104. A Y-cable 107 is used to connect the both the control and data channels to the receiving device 104.

The transmission device 102 transmits data representing an observation related to a project. A receive device 104 receives the transmitted data. A computer 101 is connected to the receive device 104, and receives the data from the receive device 104 via the data communication interface 112, as described above. A processor 120 in the computer 101 receives the data and generates one or more reference indicia related to either the observation, the received data, or both. The processor 120 further converts the received data to a digital file. The digital file is preferably in a format that can be easily stored and compressed, if necessary.

In one embodiment, the processor 120 is a central processing unit (CPU) of the computer 101. In an alternative embodiment, the processor 120 includes a digital signal processor (DSP), such as may be formed in an application specific integrated circuit (ASIC) that is typically included in either the serial port 114 or the sound card 115. The processor may therefore have a distributed processing architecture, configured to perform the functions described above.

The digital data file is stored in a file storage 135. The related reference indicia are stored as tables in a database 130. In one embodiment of the invention, the processor 120 first converts the digital file to a compressed digital file, and then stores the compressed digital file in the file storage 135. An archive 140 is provided for long-term storage and retrieval of the digital files and/or associated database records.

The file storage 135 may be any type of storage media, such as digital storage or even analog storage for storing digital content. The database 130 may be formed of any type of memory, such as a hard disk drive or other digital medium. Each database record includes one or more tables in which the reference indicia may be logically stored. The database 130 can be a single database, or a distributed collection of databases linked together across a network. Each entry in the database record in the database 130 corresponds to a project log of a project.

A project log is the collection of information contained in all database records related to a project. By storing the reference indicia into one or more accessible database records, each digital file may be accessed from the file storage 35, and a digital project log is thus formed. The digital files and the records of the project log may be retrieved for further transmitting, such as over a network via electronic mail, for example. Or the digital files and the records may be retrieved for accessing and modifying the data contained in the digital files.

Thus, in operation, a plurality of observers can each use an observation device, such as a transmission device 102, to make observation related to a certain project t log. For example, each observer can be a construction foreman. Each foreman can be in charge of several construction sites. As will be understood, a foreman is required to keep a daily log of all events that occur on a given site; however, practically, such logs are rarely maintained daily, especially when the foreman is in charge of multiple sites. As a result, important information can be left our of the log, e.g., because the foreman forgets to enter the information by the time he finally does update the log.

In system 200, however, each site can be associated with a project log stored in database 130. A foreman can thus update the log simply by placing a call using transmission device 102 and speaking observations, or updates, into device 102. Computer 101 can receive the observations via a receiving device 104, convert the received observation to the appropriate digital format and store the observation in the correct project log. First, however, computer 101, or more specifically processor 120, should have some mechanism by which it can determine the correct project log. In conventional systems, the observer, i.e., foreman, may be required to manually supply a project log identifier via transmission device 102, e.g., either by speaking the identifier into transmission device 104, or entering the identifier through the keypad. This can be problematic where each observer is associated with several project logs, because the observer likely will not remember all of the different project log identifiers with which he is associated.

Alternatively, a number, such as the cellular telephone, or push-to-talk number associated with transmission device 102 can be used. But often, more than one observer is associated with the same transmission device 102. For example, the same cellular telephone may be used by more than one foreman, or may be passed from one to another as foreman leave and come to a particular construction company.

Another alternative is to use a bank, or a plurality of receiving devices 104, and to assign each project log to one of the receiving devices 104. Thus, processor 120 can determine the appropriate project log based on an identifier associated with device used to receive an observation, e.g., the associated cellular telephone, or push-to-talk number of the receiving device. Such an approach can work where there is only a small number of project logs; however, it is often the case that the number of project logs is excessive, which would require a prohibitively excessive number of receiving devices 102.

Thus, in one embodiment, processor 120 is configured to select the appropriate project log based on a combination of the observer identifier associate with the transmission device from which the observation is received, and the receiver identifier associated with then receiving device used to receive the observation. For example, if a company employed 4 foreman, each responsible for 25 sites, and gave each of them a separate transmission device 102, it would take as few as 25 receiving devices 104 to identify all the associated project logs. Moreover, as long as the number of sites per foreman didn't exceed 25, the same 25 receiving devices could be used to service an infinite number of foreman. Practically, however, the number of foreman would be limited by the bandwidth provided by the plurality of receiving devices 104. In other words, the more foreman there are, the more likely that two or more will attempt to connect at the same time via the same receiving device 104. Thus, the number of receiving devices 104 used must take this practical constraint into account as well.

Tables 1-3 can be used to illustrate how processor 120 can use the observer identifiers in combination with the receiver identifiers to identify the correct project log as described above. It should be noted, that transmission devices 102 and receiving device 104 can be configured to provide other identifiers; however, it can be preferable to use the associated number, e.g., cellular telephone, or push-to-talk number, as no special configuring is required if such is the case.

Table 1 illustrates an example table included in a database in system 200. The table includes employee information for employees, e.g., foreman, who are authorized to access the database, according to a preferred embodiment of the invention. Table 1 is exemplary only, and the contents illustrated therein should not be used to limit the database or tables to storing a particular set of information. In the example, each authorized employee is identified by name, address, salary, SSN etc. The specific fields in the table and the types of information are company specific.

TABLE 1

| Name | SSN | Address | Phone | Salary | observer Id |
|---|---|---|---|---|---|
| Joe Smith | 123-65-4321 | 456 B St. | 7145551111 | 20000 | 10001 |
| Jane Doe | 123-45-1111 | 123 A St. | 8585551234 | 50000 | 10002 |
| John Doe | 123-45-6789 | 123 A St. | 8585551234 | 30000 | 10003 |
| Bob Smith | 123-65-2233 | 456 C St. | 6195558894 | 40000 | 10001 |

It should be noted that each employee is also associated with an observer identifier. In the example illustrated, the last column in Table 1 includes the observer identifier. In certain embodiments, as explained above, the observer identifier can be the number associated with a transmission device associated with each employee. For example, the cellular, or push-to-talk number associated with transmission device 102 used by each employee can be used as the observer identifier. Such numbers are included for each employee in table 1 in the column headed, "phone." In embodiments where this number is used, a separate observer identifier column is not necessarily needed.

It should also be noted that it is possible for two or more employees to be associated with the same observer identifier. In embodiments where a number associated with a transmission device is used to identify each employee, then this situation can exist where two or more employees share the same, e.g., cellular telephone. In which case, obviously, the employees would have the same number in the "phone" column of table 1.

Table 2 illustrates a database comprising a plurality of project logs. Each project log is associated with a specific receiver identifier, identifying a receiving device 104. In the example illustrated, Joe's personal to do list and John's personal to do list are associated with the same receiving device, i.e., the same receiver identifier. But as explained above, and below, the system can still determine which project log is being updated by combining the receiver identifier with the corresponding observer identifier. In alternative embodiments, the receiver identifier can simply be the number, e.g., cellular or push-to-talk number, associated with each receiving device as explained above.

TABLE 2

| Receiver Id | Job Log Name |
|---|---|
| 10100 | Joe's Personal To Do List |
| 10101 | Empire State Building Remodel |
| 10100 | John's Personal To Do List |
| 11000 | Bob's Personal To Do List |

Table 3 shows an authorization table for the same database. The authorization table is used to select the correct project log. Thus, when Joe wants to update his personal to do list, he calls the receiver identified as 10100. The system combines the observer identifier 10001 associated with Joe, or Joe's transmission device 102, with the receiver identifier 10100 and selects the correct project log, i.e., Joe's personal to do list. Similarly, if Bob want to update his personal to do list, he calls the receiver identified as 11000. The system combines the observer identifier 10001 associated with Bob, or Bob's transmission device 102, which happens to be the same identifier associated with Joe, with the receiver identifier 11000 and is still able to select the correct project log, i.e., Bob's personal to do list. The system will select the correct project log in each instance due to the unique combination of observer identifier and receiver identifier.

If John wants to update his personal to do list, he calls the receiver identified as receiver 10100, which happens to be the same receiver associated with Joe's to do list. The system combines the observer identifier 10003 associated with John, or John's transmission device 102, with the receiver identifier 10100 and is still able to select the correct project log, i.e., John's personal to do list. Again, the system will select the correct project log in each instance due to the unique combination of observer identifier and receiver identifier.

Table 3 can also be used to track the filename of the received data, such as a recorded call, the caller id of the call, date, time and duration of the call, etc. Each project log will have one entry in this table for each received and recorded call.

TABLE 3

| Caller Id | Receiver Id | Filename | Date | Time | Duration |
|---|---|---|---|---|---|
| 10001 | 10100 | Joe's Personal To Do List | Oct. 24, 2000 | 13:15:30 | 30 sec |
| 10002 | 10101 | Empire State Building Remodel | Oct. 24, 2000 | 13:20:01 | 10 sec |
| 10003 | 10100 | John's Personal To Do List | Oct. 24, 2000 | 14:30:02 | 15 sec |
| 10001 | 11000 | Bob's Personal To Do List | Oct. 25, 2000 | 08:30:05 | 30 sec |

Tables 1-3 therefore store reference indicia that are related to received data, which is in turn a representation of an observation. The data is stored as a digital file in a file storage. All the digital files that relate to a project form a portion of a project log. The reference indicia are stored as tables in a database to access and retrieved stored files.

Figure 3:
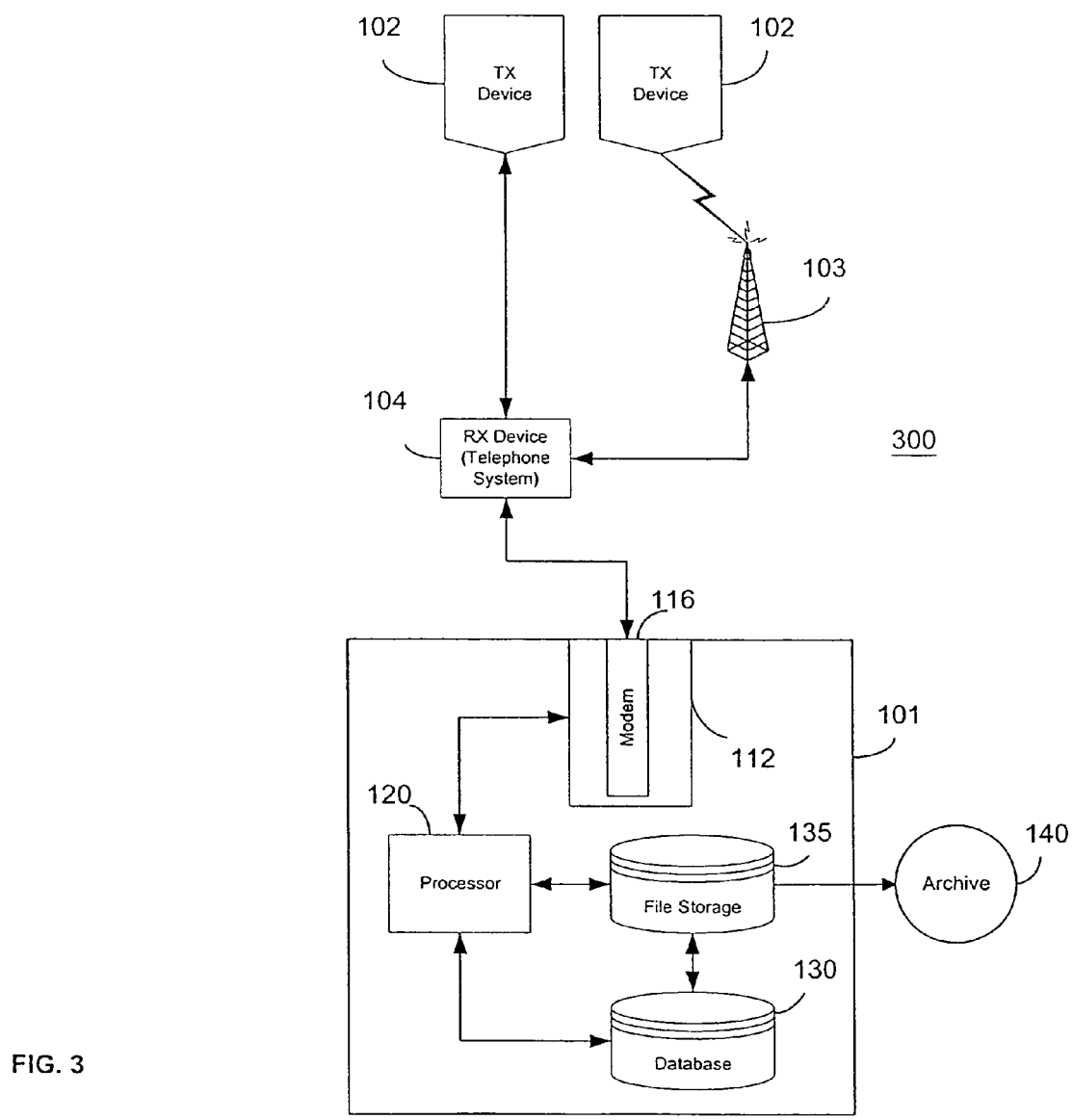
FIG. 3 illustrates another embodiment of a system for forming a project log.

FIG. 3 illustrates a system 300 for forming a project log according to an alternative embodiment of the invention. In the system 300, the data communication interface 112 to the computer 101 includes a modem 116 configured to communicate with a telephone system that functions as the receiving device 104. In one embodiment, the telephone system is known as the plain-old telephone system (POTS) through which conventional telephone signals are communicated via standard twisted-pair wire cable. In this embodiment, the transmitting device 102 is a telephone. In another embodiment, the transmitting device 102 is a cellular telephone, that is connected to the receiving device 104 via a cellular network 103.

Figure 4:
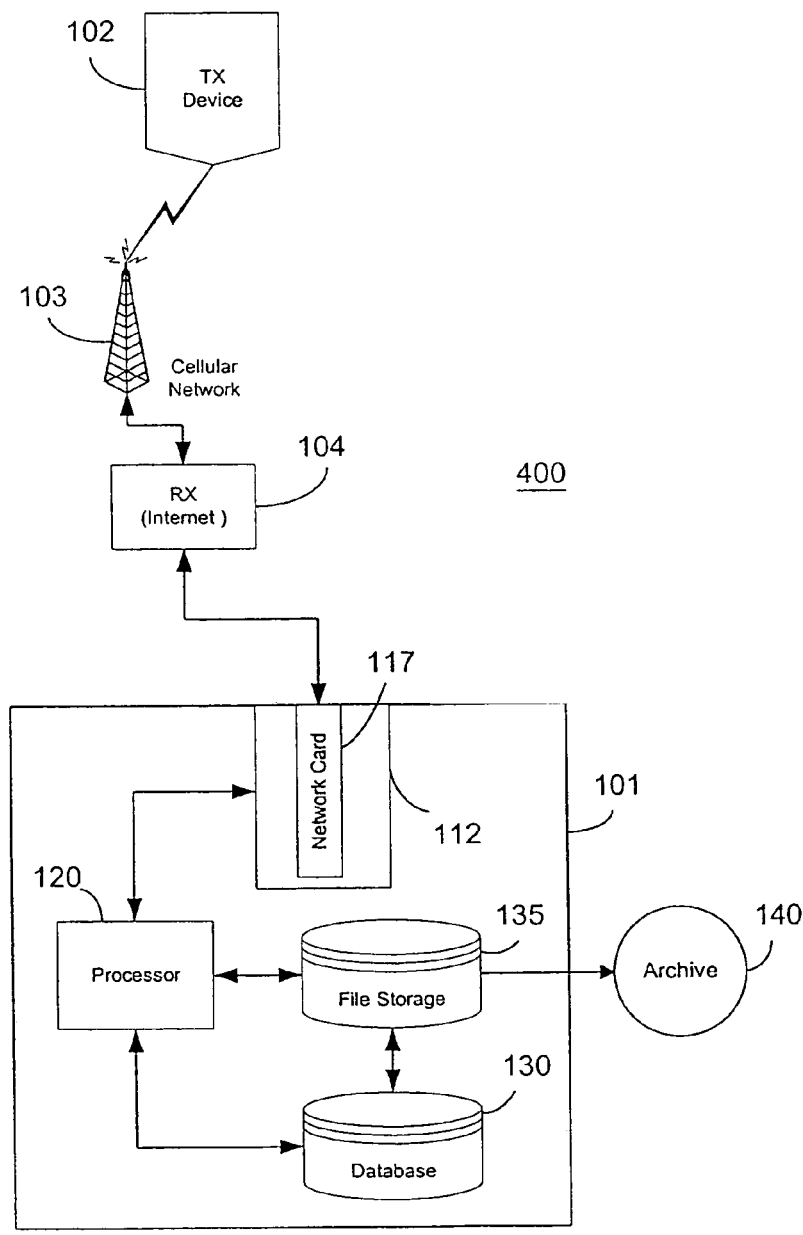
FIG. 4 shows yet another alternative embodiment of a system for forming a project log, in accordance with the invention.

FIG. 4 shows yet another alternative embodiment of the invention. A system 400 includes a computer 101 having a data communication interface 112, as substantially described above. The data communication interface 112 includes a network card 117 configured for communication with a network, such as the Internet, a portion of which acts as the receiving device 104. The transmission device 102 communicates to the receiving device via cellular network 103, which forwards digital cellular signals from the transmitting device 102.

Figure 5:
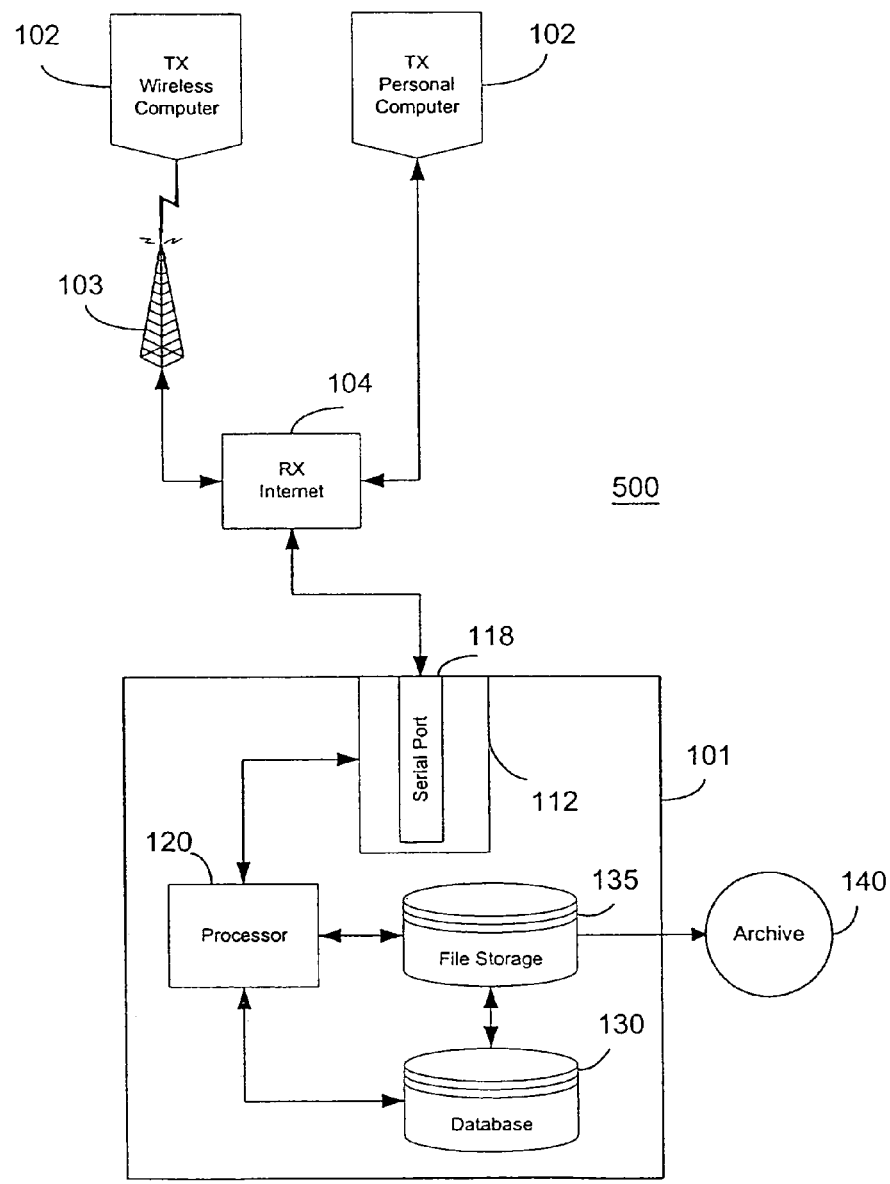
FIG. 5 shows yet another alternative embodiment of a system for forming a project log.

FIG. 5 shows still yet another system 500 for forming a project log, in accordance with alternative embodiment of the invention. In system 500, the data communication interface 112 includes a network card 118 for communication with the network. At least a portion of the network acts as the receiving device 104. Suitable transmission devices 102 for the embodiment shown in system 500 include a personal computer (PC), a wireless computer, such as a portable PC having wireless capabilities or a handheld personal digital assistant (PDA), connected to the receiving device 104 via a cellular network 103.

Figure 6:
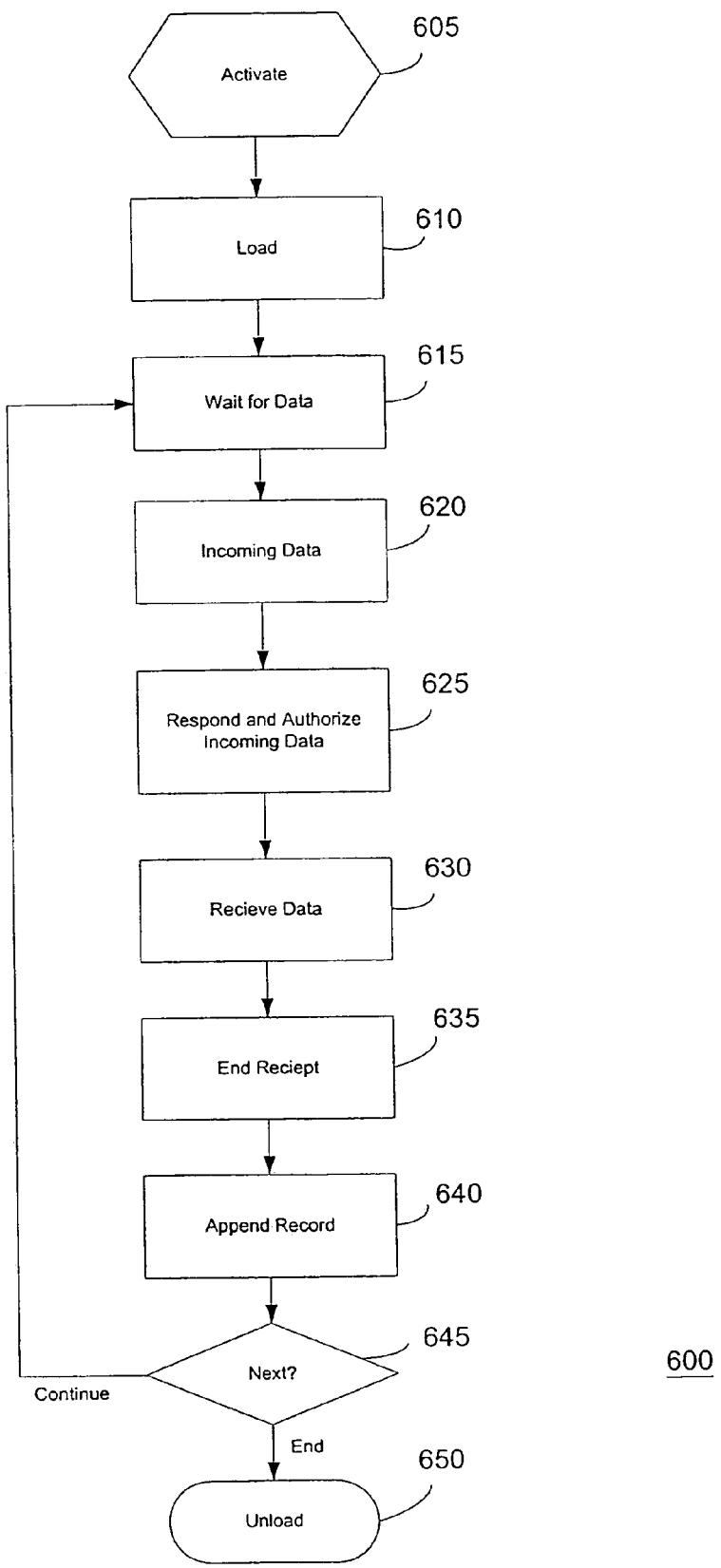
FIG. 6 illustrates one method of forming a project log according to the invention.

FIG. 6 illustrates one method 600 of forming a project log according to the invention. The method 600 is preferably executed on one of the systems described with reference to FIGS. 1-4 above, however execution of such method need not be so limited. Thus, any system or apparatus which can perform the method described herein may be suitably used and still be within the scope of the present invention.

Method 600 begins at process block 605, in which global variables are initialized within software commands the processor and controls the forming of a project log. The process block 605 thus activates a process for receiving data. According to one method of the invention, at process block 610 a plurality of multimedia control objects (MMControl) are loaded, which set up a computer for communication with the transmission device through the receive device. Process block 610 is used to initialize an audio or video recording device through MMControl. In one specific embodiment, at process block 610 a bank of cellular telephones, having a two-way radio capability and acting as transmission and/or receive devices, are initialized and connected to enable direct messaging to the computer.

At process block 615 in the method 600, a wait period is executed to wait for data being transmitted and received. At process block 620, an authorization request is received as incoming data. In an exemplary embodiment, the authorization request includes a member identification number from one member of a group of mobile phone users. The identification number is looked up in a table that is part of a database of mobile phone numbers. If the user is authorized to access the project log, then an authorization is given at process block 625. The identification number, along with the date and time of receipt of the authorization, is used to create a new record, including a filename for inclusion in the newly created record. In one embodiment, the filename will be appended to received data, and stored as a reference indication in the database.

Upon authorization, the communication link from the computer 101 to the relevant transmitting device 102 is in a state for being ready to carry data. At process block 630, data representing an observation is received. As stated above, the data may be in any form, including in digital or analog format. Examples of analog data that are suitable for the invention are voice signals from a two-way radio, cellular phone, or conventional telephone. Digital data includes digital signals sent from a digital phone or a computer. According to one specific example, an observer speaks into a cellular radio that acts as a transmission device. The voice signals are transmitted to a second cellular radio that acts as a receive device.

The data is received until process block 635, when the transmission of data is stopped, and the receipt of data is accomplished. At block 635, the step of processing the received data is accomplished. For example, the voice signals from the receive device are received as an audio stream by a computer and processed into a sound clip, or other digital file. At block 635, all properties of the system are set in order to stop receiving and recording incoming data. The received data is set for being appended with reference indicia, and a duration of time in which the data was received is calculated.

At process block 640, various database routines are called to open the authorized database records and insert the data in a new or existing record. Information that describes the data is also inserted. The record is then appended with reference indicia, which may include, but is not limited to, duration, sender identification, date, time, and filename. At step 645, a decision is made whether to execute an instruction to continue the process, or to end the method. If the process continues, the method returns to process block 615 to wait for more data. If no more data is to be received, an unload step is executed at process block 650 to deactivate incoming communication links and switch all communication devices to an inactive state.

Those skilled in the art would recognize that each embodiment of the project log forming system discussed above may be combined with other like embodiments or different embodiments. For example, the system shown in FIGS. 1-4 may be implemented with a bank of parallel data communication interfaces 112 configured for connection to a plurality of transmission devices 102.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed:

1. In a system comprising a plurality of observers, each associated with one of a plurality of observer identifiers; a plurality of receivers none of which is associated with any particular project log or other destination, or to a particular observer, and each identified by a unique receiver identifier; and a table comprising at least one record for each observer authorized to submit observations, each record in such table comprising at least three data fields, the data fields including an observation identifier field, a receiver identifier field, and a project log identifier field, a method for updating a digital project log, comprising:

prior to accepting observations from an authorized observer regarding particular project, inserting a record in the data table, such record containing at least an observer identifier, a receiver identifier to which the observer will send observations for that particular project, and an identifier of the project log to which observations sent by that particular observer to the specified receiver will be associated;

receiving via one of the plurality of receivers an observation, the observation comprising an observer identifier associated with the observer sending the received observation;

selecting a project log by reference to the data table and based on the combination of the observer identifier included with the observation and the receiver identifier associated with the receiver used to receive the observation; and storing information included in the observation in the selected project log.

2. The method of claim 1, wherein the plurality of observer identifiers comprise cellular telephone numbers associated with cellular telephones used by the plurality of observers to send observations.

3. The method of claim 1, wherein the plurality of receivers comprise a bank of cellular telephones, and wherein the plurality of receiver identifiers comprise cellular telephone numbers associated with the bank of cellular telephones.

4. The method of claim 1, wherein the received observation comprises a voice signal.

5. The method of claim 4, further comprising converting the voice signal to a digital audio signal.

6. The method of claim 1, wherein the received observation comprises audio signals.

7. The method of claim 1, wherein the received observation comprises video signals.

8. The method of claim 1, wherein each of the observers uses a push-to-talk device to send observations, and wherein the plurality of observer identifiers identify the push-to-talk devices used by the plurality of observers.

9. The method of claim 8, further comprising sending an observation by performing a transmit action.

10. The method of claim 9, wherein the transmit action comprises pressing and holding a button on a push-to-talk device while the observer speaks the observation into the push-to-talk device.

11. The method of claim 10, wherein the transmit action comprises pressing and releasing a button on a push-to-talk device before speaking the observation into the push-to-talk device, and pressing and releasing a button on the push-to-talk device when finished speaking.

12. The method of claim 1, wherein storing the information includes converting the information into a digital file format.

13. A digital project log system, comprising:

a project log database comprising a plurality of project logs;

a plurality of receivers, none of which is associated with any particular project log or other destination, or to a particular observer, each of the plurality of receivers associated with a unique receiver identifier and configured to receive observations comprising observer identifiers related to the plurality of project logs, each observation comprising an observer identifier associated with a transmission device from which an observation was transmitted;

a data table comprising at least one record for each observer authorized to submit observations to the digital project log system, each record comprising at least three data fields, the data fields including an observation identifier field, a receiver identifier field, and a project log identifier field; and a processor coupled with the plurality of receivers and the project log database, the processor configured to store a received observation in a project log by using the data table to select a project log identifier associated with the project log based on the observer identifier included in the received observation and the receiver identifier associated with the receiver used to receive the observation.

14. The digital project log system of claim 13, wherein the plurality of receivers comprise a plurality of cellular telephones, and wherein the receiver identifiers are the cellular telephone numbers associated with each of the plurality of cellular telephones.

15. The digital project log system of claim 13, wherein the plurality of receivers comprise a plurality of push-to-talk devices, and wherein the receiver identifiers are the push-to-talk numbers associated with each of the plurality of push-to-talk devices.

16. The digital project log system of claim 13, wherein the observation are received from cellular telephones and wherein the observer identifiers are cellular telephone numbers associated with the cellular telephones.

17. The digital project log system of claim 13, wherein the observation are received from push-to-talk and wherein the observer identifiers are push-to-talk numbers associated with the push-to-talk devices.

18. A digital project log system, comprising:
- a project log database comprising a plurality of project logs;
- a bank of push-to-talk devices, each push-to-talk device comprising an associated push-to-talk number and configured to receive voice signals comprising observations from a plurality of observer push-to-talk devices;
- a data table comprising at least one record for each observer authorized to submit observations to the digital project log system, each record comprising at least three data fields, the data fields including an observation identifier field, a receiver identifier field, and a project log identifier field; and
- a processor coupled with the bank of push-to-talk devices and the project log database, the processor configured to store an observation included in a received voice signal in a project log, the project log selected by reference to the data table and based on the push-to-talk number associated with the observer push-to-talk device from which the voice signal was received and the push-to-talk number associated with the push-to-talk device used to receive the voice message.

\* \* \* \* \*